No. 644,019. Patented Feb. 20, 1900.
N. H. O. LILIENBERG.
APPARATUS FOR CASTING HOLLOW INGOTS.
(Application filed Dec. 2, 1898.)
(No Model.)
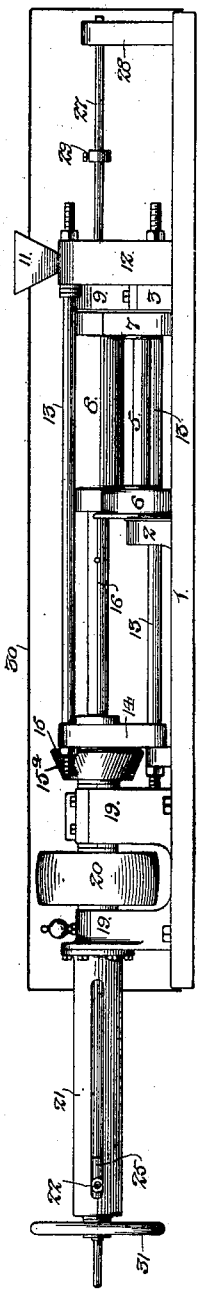
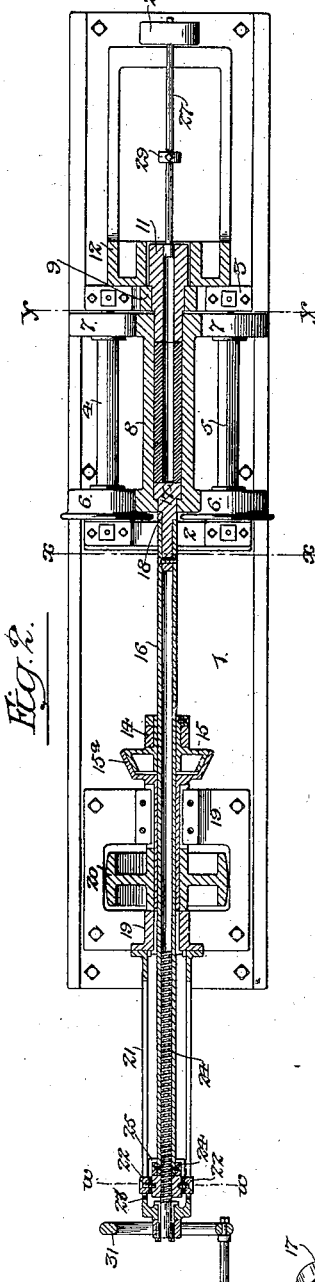

UNITED STATES PATENT OFFICE.

NILS HENRY OSSIAN LILIENBERG, OF NEW YORK, N. Y.

APPARATUS FOR CASTING HOLLOW INGOTS.

SPECIFICATION forming part of Letters Patent No. 644,019, dated February 20, 1900.

Application filed December 2, 1898. Serial No. 698,085. (No model.)

*To all whom it may concern:*

Be it known that I, NILS HENRY OSSIAN LILIENBERG, a subject of the King of Sweden and Norway, and a resident of New York city, State of New York, have invented certain Improvements in Apparatus for Casting Hollow Ingots, of which the following is a specification.

The object of my invention is to provide simple and efficient means whereby the casting of hollow ingots of steel or other metal may be rapidly effected and said ingots during the process of casting may be subjected to the action of centrifugal force. This object I attain in the manner hereinafter set forth, reference being had to the accompanying drawings, in which—

Figure 1 is a side view of ingot-casting apparatus constructed in accordance with my invention. Fig. 2 is a sectional plan or top view of the same. Fig. 3 is a transverse section on the line $w\,w$, Fig. 2. Fig. 4 is a transverse section on the line $x\,x$, Fig. 2. Fig. 5 is a transverse section on the line $y\,y$, Fig. 2; and Figs. 6 and 7 are detached views of parts of the apparatus.

The production of hollow castings in rotating molds has long been proposed; but no effective apparatus for the purpose has, so far as I am aware, yet been put into practical use. The necessary qualities of a machine for this purpose are capacity for making a large number of hollow ingots of the same size, provision for both casting and removing the hollow ingots rapidly, prevention of injury to the bearings and pulleys forming part of the machine by reason of the heat of the mold, and prevention of the clogging of the mold by gates or risers. The machine constituting the subject of my invention has been devised with the view of meeting these requirements.

The machine has a base or foundation 1, on which are standards 2 and 3, carrying bearings for shafts 4 and 5, which are free to turn in said bearings, each of the shafts having pulleys 6 and 7, to which are adapted the flanged ends of the mold 8, the pulleys thus constituting a roller-bearing for said mold and permitting of the rapid rotation of the same without undue friction. The pulleys 6 are preferably flanged, so as to retain the mold 8 longitudinally in one direction, the longitudinal retention of the mold in the opposite direction being effected by a standard 9, to which is adapted the lower projecting portion or spout 10 of the feed-hopper 11, the latter being carried by a slide 12, which is mounted upon the base of the machine, so as to be free to move longitudinally thereon, and is connected by longitudinal bolts 13 to a cross-head 14, the latter providing a bearing in which can rotate, but to which is longitudinally confined, the movable disk 15 of a friction-clutch, whereby power is transmitted to the mold-operating shaft 16, said disk 15 being keyed or otherwise securely fixed to said shaft, so that it both rotates and moves longitudinally therewith. The shaft 16 is hollow and has a head 17, which fits the interior of the mold 8 with reasonable snugness, but so that it can be moved freely therein, said head having a squared neck 18, Fig. 7, which fits a correspondingly-squared opening in the end of the mold, so that when the shaft 16 is rotated when occupying the longitudinal position shown in Fig. 2 the mold is compelled to rotate therewith. The other disk $15^a$ of the friction-clutch is secured to or forms part of a sleeve surrounding the shaft 16 and mounted in suitable bearings 19 on the base 1, said sleeve having a pulley 20 for the reception of a suitable driving-belt, or the sleeve may be rotated by an electric motor or in any other available manner, being capable of turning freely on the shaft 16.

Secured to and projecting longitudinally from one of the bearings 19 is a slotted tube 21, and to the slot of this tube are adapted blocks 22, secured to a nut 23, which engages a screw-stem 24, contained within the hollow shaft 16 and having a hand-wheel 31, whereby it may be turned, said screw-stem being carried by a bearing at the outer end of the slotted tube 21, to which bearing the stem is longitudinally confined in any appropriate manner.

Secured to the outer end of the shaft 16 is a ring 24, which bears against the nut 23, and is engaged by hooked arms 25, projecting from said nut, so that movement of the latter in either direction is imparted to the shaft 16.

The outer end of the hollow spout 10 of the filling-trough 11 is closed by a plug 26, which is connected to a rod 27, free to slide in a standard 28 on the base 1 and having a longitudinally-adjustable stud or collar 29, as shown in Figs. 1 and 2.

The operation of the device is as follows: Supposing the parts to be in the position shown in Fig. 2, but the mold to be empty and closed at one end by the head or plug 17 and at the opposite end by the projecting end of the hollow spout of the filling-hopper, as shown in Fig. 2, rapid rotative motion is imparted to the mold through the medium of the shaft 16, and at the same time the molten metal is poured into the hopper 11, finding its way by gravity through the hollow spout of the hopper and into the mold, where it is immediately subjected to the centrifugal force due to the rapid rotation of said mold and is thrown outward against the inner wall of the same. This operation is continued until the desired amount of metal has been introduced into the mold and the desired hollow ingot has been formed, whereupon the screw-shaft 24 is rotated, so as to cause forward movement of the hollow shaft 16 and with it of the cross-head 14 and slide 12. One of the first effects of this movement will be to stop the rotation of the mold, owing to the fact that the driven disk 15 of the friction-clutch is carried away from contact with the driving-disk 15ª of the same, and at the same time the spout of the filling-hopper is withdrawn from one end of the mold while the head of the shaft 16 is pushed along in the mold from the other end, so as to eject the just-formed ingot from the mold and permit it to drop down through an opening in the base 1 onto a conveyer or into a suitable receptacle. The rod 27 is carried along with the slide 12 and filling-hopper until the collar 29 on said rod comes into contact with the bearing 28, whereupon further longitudinal movement of said rod 27 is arrested, and the movement of the feed-hopper continuing the plug 26 is caused to eject from the hollow spout 10 the metal contained therein and which has not been fed into the mold, which metal would if allowed to remain in the hollow spout clog the same and prevent further flow of metal into the mold on the next operation. The direction of movement of the screw-shaft 24 is now reversed, so as to draw back the shaft 16, slide 12, and cross-head 14, thereby finally restoring the parts to the position shown in Fig. 2, preparatory to a repetition of the operations just described.

The machine is by preference provided with a close-fitting sheet-metal cover or casing 30 to prevent the access of dust or dirt to the sliding or rotating parts of the machine or to the bearings therefor.

A machine constructed in the manner before described has but few parts, which are not liable to get out of order in practice, and which do not require skilled handling, one attendant to pour the metal into the feed-hopper and another to manipulate the screw-shaft 24 being all that are required for the proper operation of the machine, which will rapidly produce ingots of uniform size and will automatically deliver the same to the desired conveyer or other receptacle.

All of the bearings for rotating or sliding parts of the machine are so far removed from the heated mold as not to be injuriously affected thereby. Hence the operation of the machine is not likely to be interfered with from this cause.

Various means may be adopted for effecting the longitudinal movement of the mold-driving shaft 16, so as to effect the ejection of the ingot from the mold. For instance, said shaft may be connected to the piston-rod of a steam or hydraulic cylinder and may be moved to and fro by admitting pressure to one or the other end of said cylinder, or when the screw-shaft 24 is used it may be rotated by power instead of by hand, and instead of positively rotating the mold the supporting-rollers or some of them may be rotated and the mold driven by frictional contact therewith, the positive rotation of the mold being, however, in all cases to be preferred, and although I have shown the mold as disposed horizontally my invention may, if desired, be applied to a mold arranged vertically or at an angle, the horizontal mold being preferred as the most convenient.

Having thus described my invention, I claim and desire to secure by Letters Patent—

1. The combination of an ingot-mold, a support upon which the same can be rotated, means for feeding molten metal into the mold, and a shaft engaging with the mold to rotate the same and movable longitudinally with reference to the mold so as to serve as an ingot-ejector, substantially as specified.

2. The combination of an ingot-mold, a support upon which said mold can be rotated, means for feeding molten metal into the mold, a shaft having a portion engaging with the mold so as to rotate the same and a head serving as an ingot-ejector and means for rotating said shaft and for causing longitudinal movement of the same with reference to the mold, substantially as specified.

3. The combination of an ingot-mold, means for rotating the same, a feed-hopper having a hollow spout adapted to one end of the mold, an ejector adapted to the opposite end of the mold, means for causing simultaneous longitudinal movement of said feed-hopper and ejector, substantially as specified.

4. The combination of an ingot-mold, a support upon which the same can be rotated, a driving-shaft capable of longitudinal motion with reference to the mold and having means for rotating the mold, and a friction-clutch for rotating said shaft, one portion of said clutch being longitudinally fixed and the other longitudinally movable with the shaft, substantially as specified.

5. The combination of a rotatable ingot-mold, a feed-hopper movable longitudinally from and toward the mold and having a hollow spout communicating with said mold, and an ejector for discharging the metal from said spout when the hopper is moved away from the mold, substantially as specified.

6. The combination of the rotatable ingot-mold, a feed-hopper having a spout communicating with the mold, means for mounting said hopper so that it can slide longitudinally, and an ejector for forcing the metal from said spout as the feed-hopper is moved, substantially as specified.

7. The combination of a rotatable mold, a feed-hopper having a hollow spout communicating with said mold, means for mounting said hopper so that it can slide longitudinally, an ejector-rod also mounted so as to slide, and a collar for limiting the sliding movement of said ejector-rod, substantially as specified.

8. The combination of the revoluble ingot-mold, means for supporting the same, a longitudinally-movable shaft having means for rotating said mold, a non-revoluble nut longitudinally confined to said shaft, and a screw-stem for operating said nut, substantially as specified.

9. The combination of the revoluble ingot-mold, a support therefor, a longitudinally-movable shaft having means for rotating said mold, a nut longitudinally confined to said shaft, a screw-stem for operating said nut and a retainer for preventing the turning of the nut with the shaft, substantially as specified.

In testimony whereof I have signed my name to this specification in the presence of two subscribing witnesses.

NILS HENRY OSSIAN LILIENBERG.

Witnesses:
  WILL. A. BARR,
  JOS. H. KLEIN.